W. H. BROWN.
ANTISKID DEVICE.
APPLICATION FILED MAR. 2, 1917.

1,333,898. Patented Mar. 16, 1920.

Witness
J. R. Gomez
R. L. Parker

Inventor
W. H. Brown
By C. A. Snow & Co.
Attorneys.

UNITED STATES PATENT OFFICE.

WILLIAM H. BROWN, OF MARGARETVILLE, NEW JERSEY.

ANTISKID DEVICE.

1,333,898.  Specification of Letters Patent.  Patented Mar. 16, 1920.

Application filed March 2, 1917. Serial No. 152,023.

*To all whom it may concern:*

Be it known that I, WILLIAM H. BROWN, a citizen of the United States, residing at Margaretville, in the county of Delaware and State of New Jersey, have invented a new and useful Antiskid Device, of which the following is a specification.

The present invention appertains to antiskid devices for use upon pneumatic tires of motor vehicles, and it is the object of the invention to provide an anti-skid device of novel and improved construction, to enhance the utility and efficiency thereof, and to render the same comparatively simple and inexpensive in construction.

It is the object of the invention to provide an anti-skid device applicable readily to the pneumatic tires, and collapsible when detached, the device having means for preventing the creeping thereof on the tire to eliminate circumferential movement of the device, whereby to effectively prevent skidding both longitudinally and laterally, and to facilitate traction.

The invention also aims to eliminate the objections incident to the use of ordinary anti-skid chains which are loose upon the tires, and the invention has for its further object to eliminate the use of side chains and to provide novel means, constructed chiefly of cable or an equivalent flexible element, for holding the shoes in place.

With the foregoing and other objects in view which will appear as the description proceeds, the invention resides in the combination and arrangement of parts and in the details of construction, hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1:
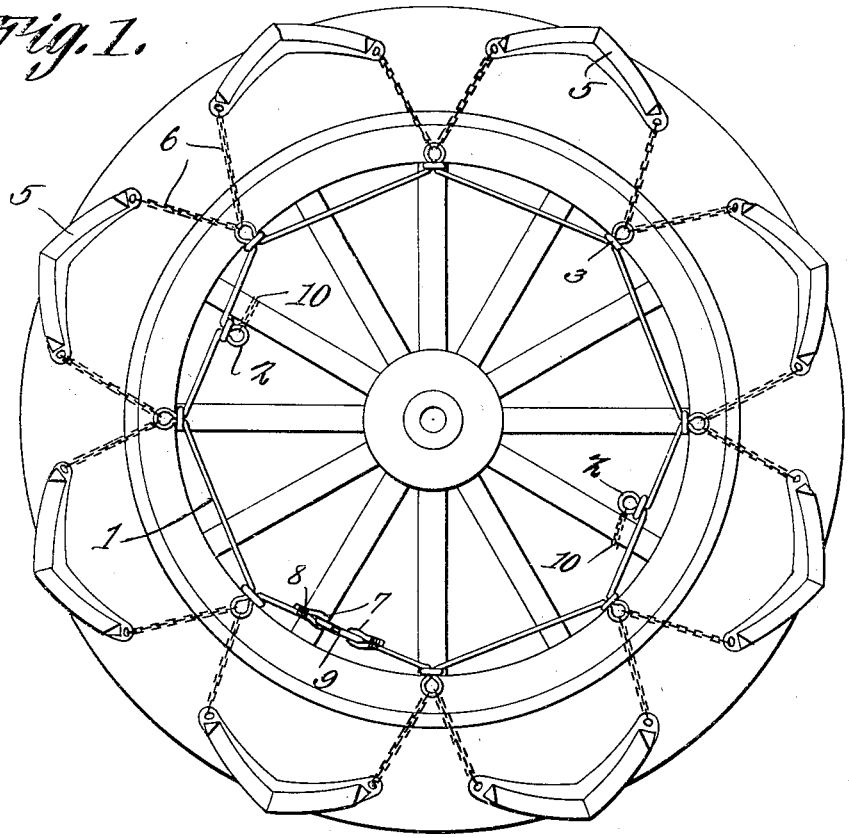
Figure 1 is a side elevation of the device as applied to a wheel.
Figure 2:
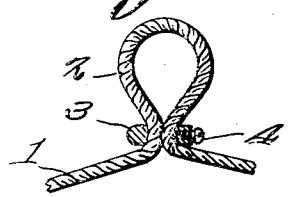
Fig. 2 is an enlarged detail view illustrating one of the loops of the cable.

In carrying out the invention, the device is provided with a cable 1 to be disposed at one side of a vehicle wheel, two of these cables being used at the opposite sides of the wheel, as is well understood. The cable 1 can be composed of strands of wire or equivalent material and is flexible in order that the device can be folded or rolled up when not in use to be compactly stored. This cable 1 is provided at intervals or at longitudinally spaced points with loops 2 which are held closed by bands or clamps 3 embracing the limbs of the loops and clamping screws 4 can be carried by said bands for clamping the limbs of the loops tightly together. The shoes 5 which bear against the tread of the tire are preferably of the type disclosed in my copending application for patent on anti-skid device, Serial No. 143,967, filed Jan. 23, 1917, issued as Patent No. 1,238,490, patented Aug. 28, 1919, although various forms of shoes can be used. These shoes 5 have short chains or flexible elements 6 connected thereto and converging to and engaged with the loops 2, whereby the cables 1 serve to hold the shoes in place upon the tire.

The ends of the cable 1 have loops 7 fastened, as at 8, and adapted to be connected by a snap fastener or catch 9 of any suitable sort, whereby the ends of the cable can be readily connected and disconnected.

Those loops 2 to which the chains 6 are connected extend radially outward, and a suitable number of other loops 2 are provided which extend inwardly for the engagement of chains 10 or equivalent elements which extend across or are otherwise engaged with certain spokes of the wheel, to prevent the circumferential movement of the shoes upon the tire. When the device is first placed on a wheel, and when the ends of the cable 1 are connected, the cable will assume a polygonal form, substantially as shown in Fig. 1.

Figure 4:
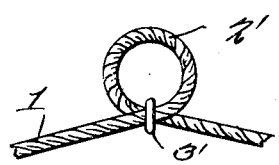
Fig. 4 is a detail view illustrating a modified form.

Fig. 4 illustrates another method of forming the loops. Thus, the loop 2' extends through a complete circle, and those portions of the cable which cross each other are clamped together by a band or clamp 3', as clearly seen in Fig. 4.

Figure 5:
Fig. 5 is a sectional view illustrating another modification.
Figure 3:
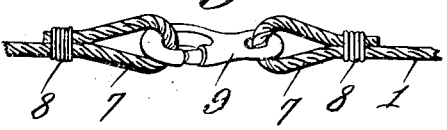
Fig. 3 is an enlarged detail view illustrating the connection for the ends of the cable.

Fig. 5 illustrates a simple clamp 3' embracing the loop 2 without the use of a set screw.

Figure 6:
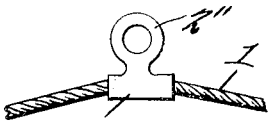
Fig. 6 is a detail view illustrating a further variation.

Fig. 6 illustrates still another means for providing the loops on the cable. In this form, a sleeve 3″ embraces the cable and is provided with the loop 2″. In this form the loops are composed of separate pieces fastened to the cable.

Having thus described the invention, what is claimed as new is:—

An anti-skid device embodying a holding cable having outwardly projecting loops at spaced intervals, and inwardly projecting loops at diametrically opposite points, shoes connected to the outwardly projecting loops, and means connected to the inwardly projecting loops for anchoring the cable to spokes of a wheel.

In testimony that I claim the foregoing as my own I have hereto affixed my signature in the presence of two witnesses.

WILLIAM H. BROWN.

Witnesses:
   IVY E. SIMPSON,
   PHILOMENA A. ROCKELLI.